Nov. 1, 1949.  O. J. HUELSTER  2,486,411
FASTENER
Filed Aug. 7, 1943
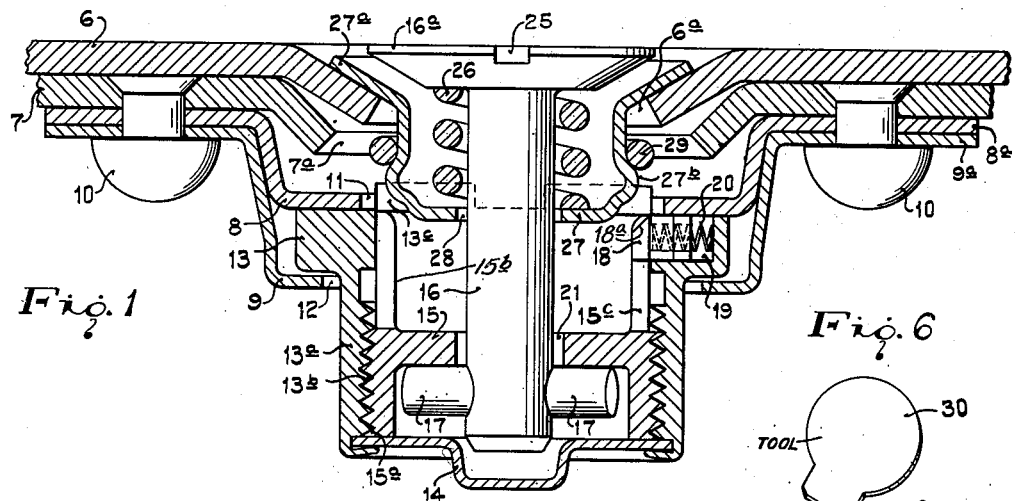
Fig. 1
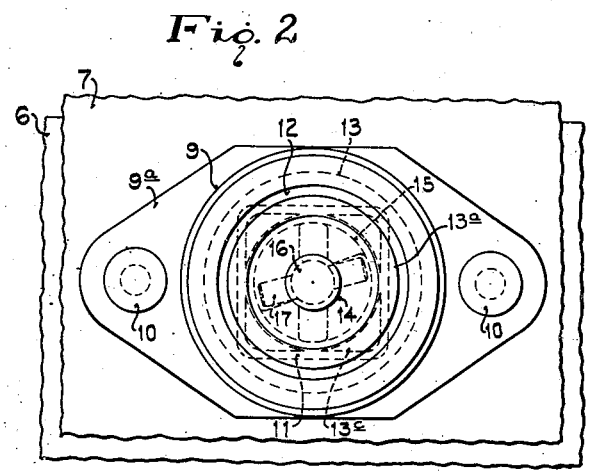
Fig. 2
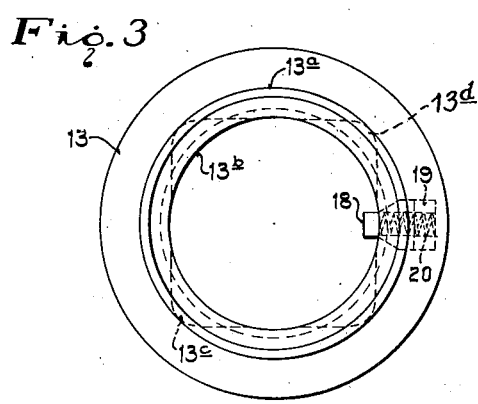
Fig. 3
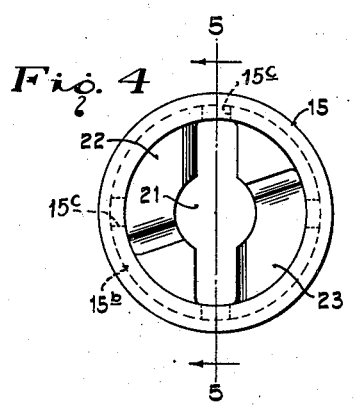
Fig. 4
Fig. 6
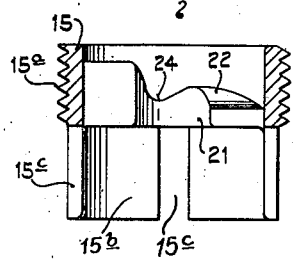
Fig. 5
INVENTOR.
Otto J. Huelster
BY F. Bascom Smith
ATTORNEY.

Patented Nov. 1, 1949

2,486,411

UNITED STATES PATENT OFFICE 2,486,411

FASTENER

Otto J. Huelster, Waterbury, Conn., assignor to Scovill Manufacturing Company, Waterbury, Conn., a corporation of Connecticut Application August 7, 1943, Serial No. 497,720

7 Claims. (Cl. 24—221)

This invention relates to fasteners, and more particularly to fasteners of the cam and stud type now extensively used in aircraft for quickly clamping and unclamping cowls, covers, hoods and other parts to and from mounting structures.

Usually, fasteners of the above type are adapted for use with parts or plates of one thickness only. However, airplane cowlings, for example, vary in thickness and it has heretofore been the practice of suppliers to furnish the users with studs of many different lengths in order to make available studs of the proper length to fit a particular thickness of plates, whereby undue plate separation is prevented when the fasteners are in clamping position. This requires the selection and testing of a number of studs which is wasteful of time and may result in an improper selection.

One of the objects of the present invention is to provide a novel and simplified fastener adapted for use with parts or plates of differing thicknesses.

Fasteners of the cam and stud type must frequently be used with parts subject to misalignment, such as results from constructional tolerances or temperature changes, and one of the objects of the invention is to provide a novel fastener which may be quickly engaged or released even when the parts clamped or unclamped are not in exact alignment.

In order to facilitate repair and replacement of fastener parts it is frequently necessary to remove the stud from the plate or other part, such as the cowling, that supports said stud. Accordingly, another object is to provide a novel combination of elements, or stud assembly, which includes the usual stud, so constructed and arranged as to secure this result.

The above and other objects will appear more fully in the following detailed description which is to be read in connection with the accompanying drawings wherein like reference numerals refer to like parts throughout the several views. It is to be expressly understood, however, that the drawings are for the purpose of illustration only and are not designed as a definition of the limits of the invention, reference being had primarily for this purpose to the appended claims.

In the drawings,

Fig. 1 is an enlarged section view of the fastener embodying the present invention;

Fig. 2 is a plan view looking toward the bottom of Fig. 1 but at a reduced scale;

Fig. 3 is a plan view on a different scale of the cam housing shown in section in Fig. 1;

Fig. 4 is a plan view of the cam block shown in section in Fig. 1;

Fig. 5 is a section taken on line 5—5 of Fig. 4; and

Fig. 6 is a perspective, on a reduced scale, of one form of a tool which may be employed for moving the cam block relative to its associated elements.

In the form shown, the fastener is adapted to yieldingly clamp a plate 6 to a supporting plate or member 7. The latter carries the cam assembly of the fastener, and plate 6 carries the stud assembly which is readily removable. Preferably, the cam assembly includes an inner shell 8 and an outer shell 9 which have overlying flanges 8a and 9a, of any suitable contour, to receive fastening members, such as rivets 10, for securely attaching the shells to support 7. The central portion of the shells are cup-shaped and are provided with central aligned openings 11 and 12, respectively, the opening in inner shell 8 preferably being rectangular. When in assembled position, the central portions of the shells are axially spaced because of the greater depth of the outer shell, and into this space extends the circular flange 13 of a cylindrical cam housing 13a that is internally threaded as at 13b. Projecting downwardly through opening 11 in the inner shell is a flange 13c integral with the cam housing 13a whereby rotation of said housing relative to the inner and outer shells is prevented. As shown more clearly in Figs. 1 and 3, flange 13c consists of four elements 13d which are triangular in shape, the hypotenuse of the triangle being arcuate, with the radius of the arcuate surface equal to that of the central opening in the flange portion 13 of housing 13a. The four triangular portions forming flange 13c are equi-spaced around said central opening. Preferably a cap 14 is secured to the housing in any suitable manner, as by spinning over the adjacent open end of housing 13a, to close the end of said housing opposite the flange 13c. It will be noted that openings 11, 12 are larger than the portions of the cam housing extending therethrough. This permits lateral movement of the housing relative to inner and outer shells 8, 9, to compensate for misalignment of plates 6 and 7. After the cam housing is mounted in the shells, the flanges 8a, 9a, thereof may be rigidly attached to each other, as by spot welding, for example.

Mounted within the cam housing 13a is a cam block 15 adapted to be moved axially relative to the housing and to cooperate with a stud 16 having laterally extending portions 17. Longitudinal movement of the cam block relative to the housing may be provided for by threading the outer surface of the block for a portion of its length, as at 15a, these threads being adapted to cooperate with the threads 13b in the housing. By positioning the cam block at selected positions longitudinally of the housing the effective length of the stud is varied, whereby the fastener is adapted to handle sheets of various thicknesses, i. e., the combined thickness of the sheets may differ.

Means are provided for locking the cam block in the selected position relative to the housing. As illustrated, the cam block which is preferably formed of a hard metal, such as steel, to prevent excessive wear, is provided with a skirt 15b in which are formed elongated longitudinally extending slots 15c that are spaced around the periphery of the cam block at equal angular intervals. Preferably four such slots are provided to cooperate with one or more detents or catches 18 (only one is illustrated) carried in one or more recesses 19 in the flange 13 of the cam housing. Detents 18 are provided with circular axial pockets, and the inner or operative end thereof that extends into slot 15c is of a reduced thickness as shown in Fig. 3. A spring 20 positioned in the pocket in the detent but extending therefrom to engage the end of recess 19 in the flange 13 yieldingly holds the detent in the adjacent slot of the cam block, whereby the latter is retained in the desired position longitudinally of the housing.

As shown more clearly in Fig. 4, the cam block 15 is provided with a central elongated opening 21 which permits passage therethrough of the beveled end of stud 16 and the laterally extending portion 17 which are adapted to engage two similar and arcuate cam surfaces 22 and 23 formed in the block 15 (Fig. 4). Each cam surface is provided with an arcuate notch or depression 24 (Fig. 5) to prevent rotary movement of stud portions 17 when the latter are engaged therein.

The stud assembly comprises the stud 16 having an enlarged head 16a formed with a groove 25 for receiving a tool, such as a coin or a screwdriver, whereby the stud may be rotated to engage the laterally extending portions 17 with, or disengage said portions from, cam surfaces 22 and 23. Surrounding the stud and bearing at one end against the flange formed by the enlarged head 16a is a coil spring 26 which engages, at its opposite end, a spring retainer 27, provided with a central opening 28 of such contour and size as to permit ready passage therethrough of the shank of the stud 16. In the form shown, the laterally extending portions 17 carried by the stud are the opposite ends of a pin passed through an opening in the stud with a drive fit.

The spring retainer 27 is preferably a cup-shaped member having a beveled flange 27a, and is preferably made of a wear resistant metal, such as steel. The bowl of the cup-shaped portion of the retainer extends loosely through a circular opening 6a in plate 6. Intermediate the flange 27a and the apertured end of the retainer there is provided, in any suitable manner, a shoulder 27b against which bears a snap spring ring 29 having an outer diameter slightly larger than the opening in the supporting plate or cowling 6. In order to provide a streamlined structure, a portion of plate 6 surrounding the opening 6a therein is preferably beveled inwardly at substantially the same angle as that of the flange 27a of the retainer. The opening 7a in plate 7 may be somewhat larger than the opening in plate 6 and is substantially in axial alignment therewith, a portion of plate 7 surrounding the opening being inclined inwardly similar to plate 6.

If in use it is found that the thickness of either of the plates 6 or 7, or both, is greater or less than the combined thickness for which the stud was designed, plate 6 and the stud assembly carried thereby, are moved clear of plate 7 and its cam assembly, and a tool 30, such as is shown in Fig. 6, is used to move the detent 18, against the pressure of spring 20, out of the engaged slot 15c in the skirt 15b of the cam block, whereupon the cam block may be rotated relative to the housing, to move the cam to the desired position.

As shown, tool 30 is a thin metal disc having a laterally extending, substantially rectangular tab 30a the width of which is slightly less than the outer diameter of skirt 15b of block 15. The two corners of the tab, forming the leading end of the tool, are beveled, as at 30b, to facilitate entrance of the tab into two diametrically opposite slots in the skirt of the cam block, and engagement with detent 18. As illustrated in Fig. 1, the upper end 18a of the detent may also be beveled, if desired, to facilitate engagement therewith of the beveled tab of the tool. When detent 18 is moved out of the engaged slot 15c in cam block 15 by tool 30, it will move under the pressure of spring 20 into the next adjacent slot in the cam block when the latter has been rotated through an angular distance equal to that separating two adjacent slots, thus limiting the longitudinal movement of the cam relative to the housing for one operation of the tool.

There is thus provided a novel fastener which is simple in construction and inexpensive to manufacture. The provision for lateral movement of the cam block compensates for any misalignment of the openings in the plates. Plates or parts having a combined thickness greater or less than that for which the stud was designed can be quickly clamped with assurance that undue plate separation will be avoided. The stud assembly is such that curved or bent plates can be readily clamped. Moreover, if the pin or projecting portions 17 are damaged, the snap ring 29 may be easily removed, the stud assembly withdrawn, and a new one substituted. The cap 14 prevents entrance of foreign matter into the cam housing and serves as a stop to limit movement of the cam block in one direction, relative to the housing. Frequently, plate 6 is formed of a soft metal, such as aluminum. The flanged retainer being of a hard metal, renders unnecessary the use of an eyelet to protect plate 6 against wear. The beveled flange of the retainer and the beveled surface of the plate 6 provide a connection having some of the properties of a swivel, or a ball and socket joint, whereby the stud cooperates with the laterally movable cam to compensate for misalignment. While either pin 17 or cam block 15 may be adapted for relative movement at right angles to the plates, it is the cam block that may be so moved by the use of a simple tool in the embodiment of the invention that is illustrated. Preferably, one detent only is employed for locking the cam block to the housing, but two or more may be used if desired. While the cam block may be made of steel, it will be understood that it may be made of a softer metal treated or covered in any suitable manner known in the art, to provide wear resistant cam surfaces. The fastener has a wide variety of uses and, as will be understood by those skilled in the art, is not limited to aircraft use.

What is claimed is:

1. A fastener for yieldingly clamping a first member to a second member, comprising cam means, inner and outer shells having openings therein for securing the cam means to the first member, and means carried by the cam means and extending through one of said openings in one of said shells to prevent rotation of the cam means relative to the shells.

2. In combination, a cam assembly carried by a first member comprising inner and outer shells secured to the first member, a cam housing having a flange loosely held between said shells and a second flange extending into an opening in the inner shell to prevent rotation of the housing relative to the first member, a cam block provided with a pair of cam surfaces positioned in said housing and having threaded engagement therewith, and means carried by said cam housing for locking the block in a selected position relative to said housing.

3. In a fastener of the cam and stud type, the combination of a cam housing, a cam adapted to be mounted for longitudinal movement in said housing, means for locking said cam in a selected position in said housing, and means adapted to mount said housing for limited lateral movement on a supporting member.

4. In a fastener of the cam and stud type, the combination of a cam housing, means to secure said housing to a support, a cam adapted to be mounted for longitudinal movement in said housing, and means for fixing said cam in a selected position with respect to the housing.

5. In a fastener of the cam stud type, the combination of a cam housing having a flange, a pair of apertured plates engaging the flange for securing said housing to a support, the apertures in said plates being larger than the portions of the housing extending therethrough, a cam member mounted in the housing and having threaded engagement therewith, and means for locking said cam member to said housing.

6. In a fastener of the cam and stud type, the combination of a cam housing having threads formed on the interior thereof, means including two apertured plates for securing said housing to a supporting member for limited lateral movement relative thereto, a cam member having threaded engagement with the threads in the housing whereby the cam member may be moved longitudinally relative to the housing, said cam member being provided with one or more slots, and means carried by the housing and extending into one of said slots for locking the cam member in a selected longitudinal position within the housing.

7. In a fastener of the type wherein a stud is adapted to releasably engage a cam member, the combination of a cam housing, a cam member adapted to be mounted for axial movement relative to said housing, means engaging the housing and cam member for locking the latter in a selected position of adjustment in said housing, and means for mounting the cam housing for limited lateral movement relative to a supporting member.

OTTO J. HUELSTER.

REFERENCES CITED

The following references are of record in the file of this patent:

UNITED STATES PATENTS

| Number | Name | Date |
| --- | --- | --- |
| 2,306,967 | Mack | Dec. 29, 1942 |
| 2,315,335 | Kane | Mar. 30, 1943 |

FOREIGN PATENTS

| Number | Country | Date |
| --- | --- | --- |
| 486,025 | Great Britain | May 27, 1938 |